United States Patent [19]

Wilmot et al.

[11] 3,997,731
[45] Dec. 14, 1976

[54] APPARATUS FOR CUSTOM CALLING FEATURES IN A TELEPHONE SYSTEM

[75] Inventors: Charles David Wilmot; William Lee Webb, both of Milan; Kervyn George Collyer, Humboldt, all of Tenn.

[73] Assignee: International Telephone and Telegraph Corporation, New York, N.Y.

[22] Filed: Apr. 14, 1975

[21] Appl. No.: 567,485

[52] U.S. Cl. .............................................. 179/18 B
[51] Int. Cl.² .......................................... H04M 3/42
[58] Field of Search ........ 179/18 B, 18 BG, 18 BC, 179/98

[56] References Cited
UNITED STATES PATENTS 3,755,630  8/1973  Boyer ................................. 179/98

Primary Examiner—William C. Cooper
Attorney, Agent, or Firm—J. B. Raden; M. M. Chaban

[57] ABSTRACT

Disclosed is an arrangement of circuits for providing what is normally called Custom Calling or Special Services features such as signalling and switching for a call waiting or three-way calling. The apparatus shown may provide either feature or may provide both services by the selection and insertion of one of three available circuits. A plurality of common circuits are provided to operate with specific electronic logic circuits for call waiting, three-way calling or both. Circuits are plug-in PC boards using integrated circuit logic. Individual plug-in cards are provided—one for the call waiting feature, another for three-way calling and a third card is used to provide both features. The entire apparatus may be connected to the subscriber lines and to the central office equipment at the main distributing frame thereby requiring no internal wiring or circuit changes in the central office.

7 Claims, 14 Drawing Figures

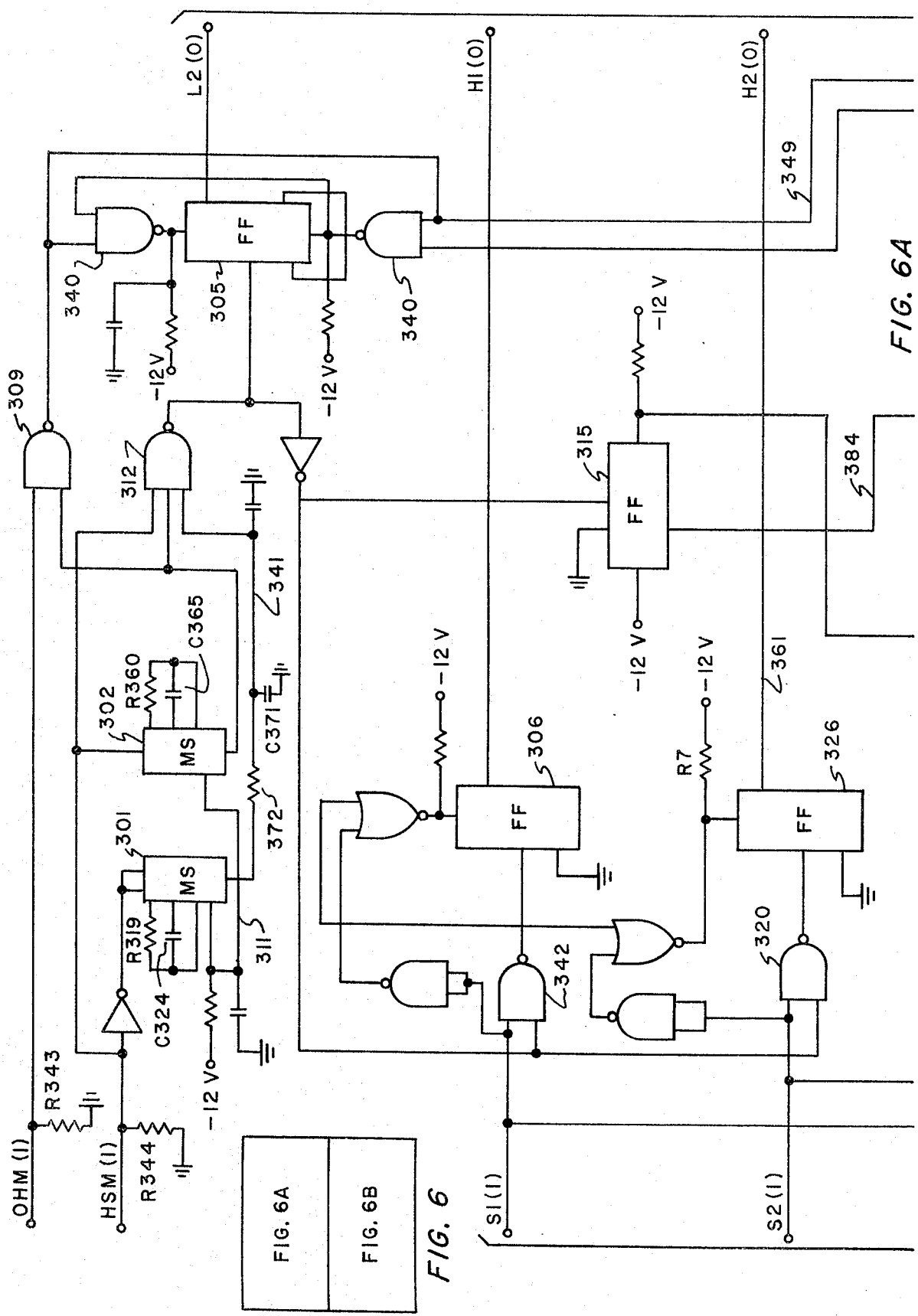

APPARATUS FOR CUSTOM CALLING FEATURES IN A TELEPHONE SYSTEM

BACKGROUND OF THE INVENTION

Custom calling features are well-known for telephone systems. With the advent of electronic components and especially integrated circuits, the providing of these service features may be accomplished expediently in an inexpensive manner. These features may be provided both in the computercontrolled exchanges now being developed and produced in the electromechanical exchanges prevalent in the industry.

Such special features are shown, for example in U.S. Pat. No. 3,377,433 issued 4/9/68 to W. Whiteney, U.S. Pat. No. 3,342,934 issued 9/19/67 to H. Koh et al, and U.S. Pat. No. 3,811,015 of 5/14/74 to R. Beth et al.

SUMMARY OF THE INVENTION

The invention provides an improved apparatus for providing one or more "custom calling" or special services features such as three-way calling and call waiting service. The apparatus comprises a plurality of printed circuits including buffer and power control circuits which are employed regardless of the type of feature circuit used. Individual logic circuits are used to provide either feature and a combination logic circuit is used where both available features are desired. The apparatus may be coupled to line circuits at the main distributing frame and in this way, no interconnections or wiring changes internal to the exchange need be made.

The apparatus features circuits mounted on plug-in cards. Each feature unit employs a control card and an interface card in addition to a logic card. One of three logic cards may be used interchangeably to provide either or both of the features noted in conjunction with the interface and control card usable for all three logic circuits.

By using the interconnection at the MDF and by providing common circuits for line control and buffering, either or both service features may be provided by inserting the necessary circuit in a fully flexible manner. The service features may be readily added to or detached from the connection of any line circuit. In this way, one or both of the features may be provided with a minimum expenditure of time and effort.

It is therefore an object of the invention to provide improved apparatus for the addition of one or more features such as three-way calling or call waiting control in a novel manner.

It is a further object to provide apparatus to provide one or more special features, the apparatus being adapted to be connected to two line circuits at a main frame connection to the line circuits to provide optional features for a telephone line.

It is a still further object of the invention to provide an apparatus for a telephone line which allows ready interchange to provide either a three-way calling arrangement accessible from that line, or a call waiting arrangement for that line or both such arrangements by the insertion of a predetermined one of three printed circuit boards.

It is a still further object of the invention to provide apparatus for connection to and control of any line circuit for which special services features are to be applied.

BRIEF DESCRIPTION OF THE INVENTION

DETAILED DESCRIPTION

Figure 1:
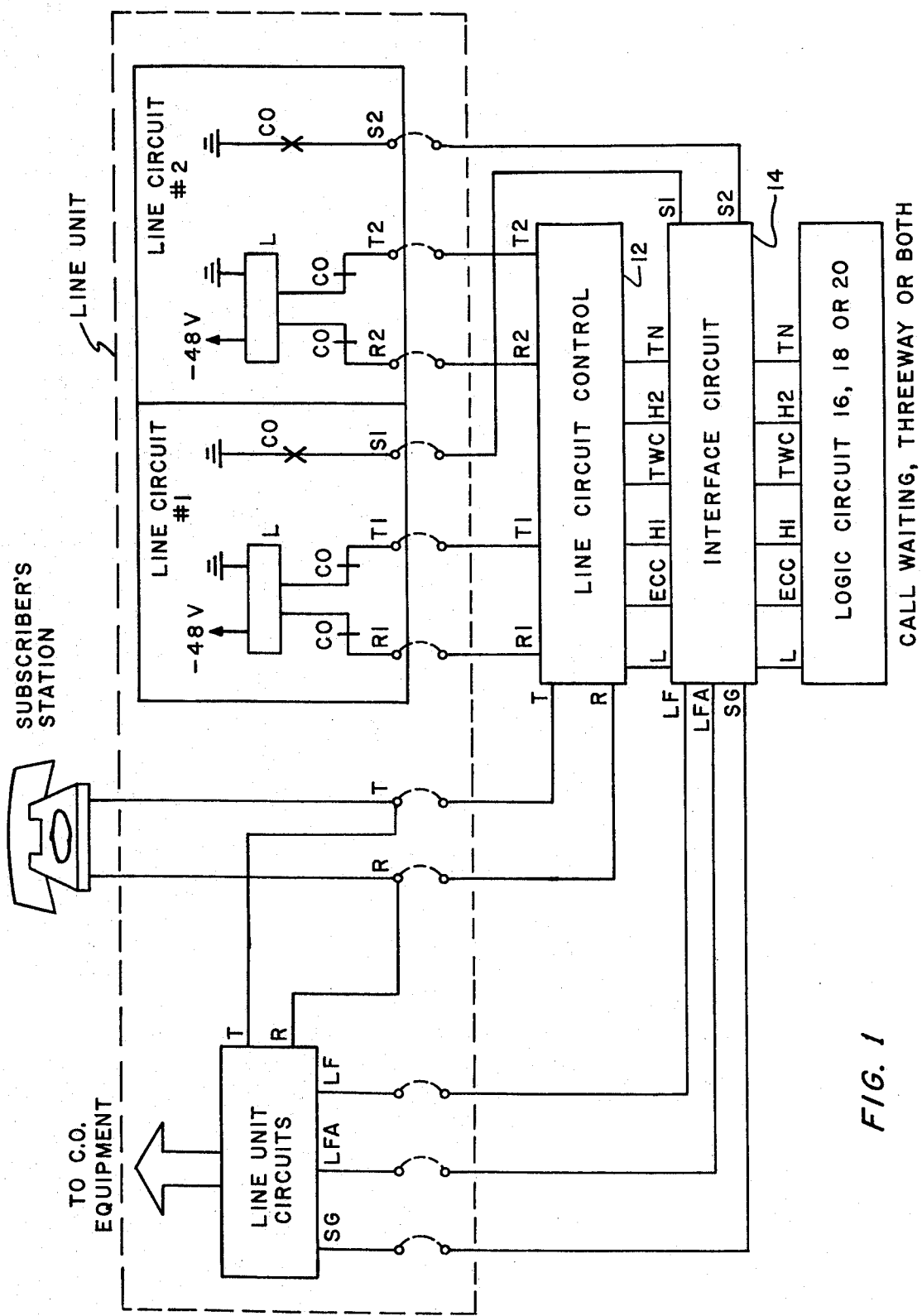
FIG. 1 is a schematic block diagram of the apparatus of the present invention.

In FIG. 1, we show a block diagram of our apparatus as fitted within a telephone system, exemplarily of the type shown in U.S. Pat. No. 3,441,677 issued 4/29/69 to E. L. Erwin et al. The apparatus comprises a line circuit control 12, an interface circuit 14 and one of three logic circuits 16, 18 and 20, these being shown in detail in FIGS. 6–8 to provide call waiting service (circuit 16); three-way calling (circuit 18) or to provide both (circuit 20).

Figure 2:
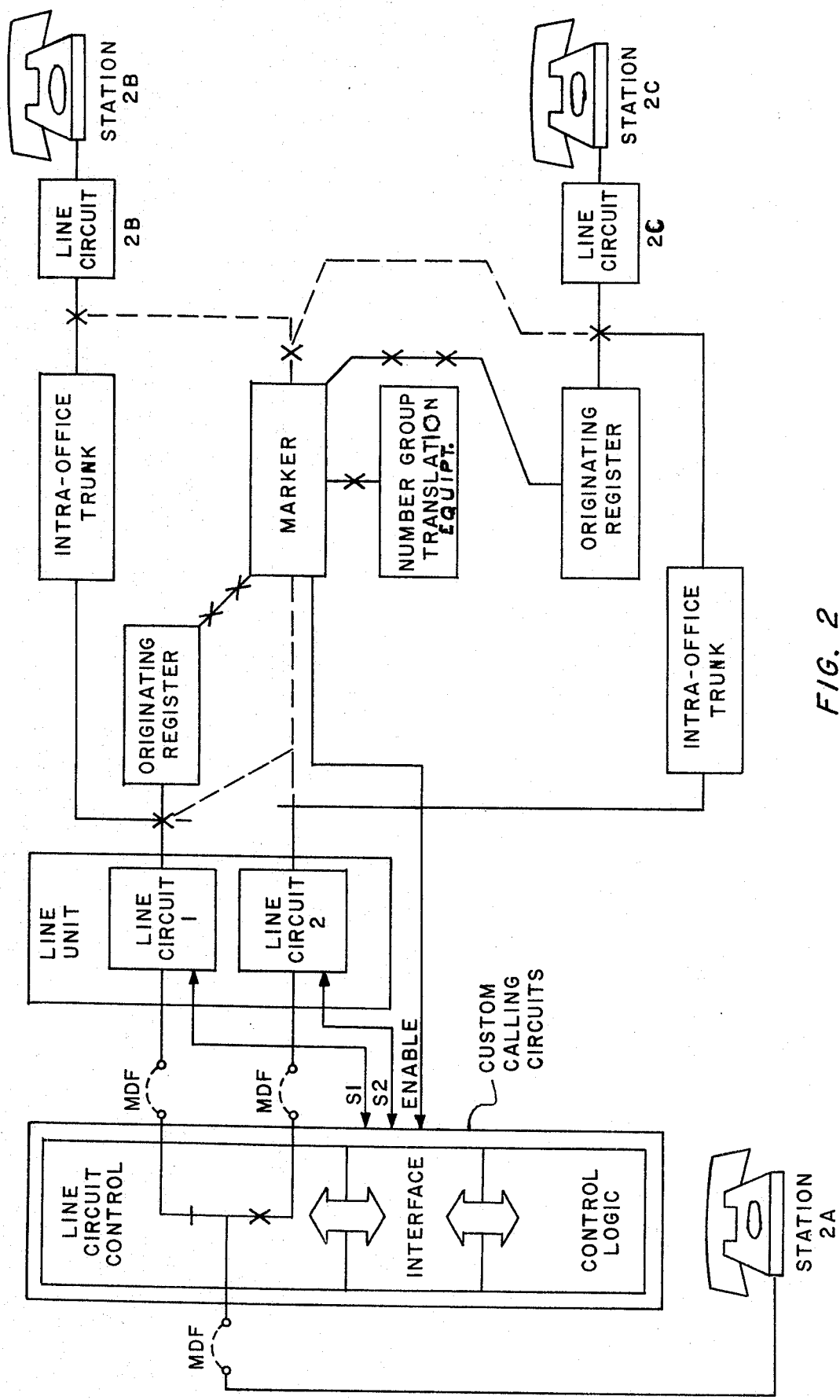
FIG. 2 is a schematic block diagram of the operation of the apparatus of FIG. 1 within a known telephone system to provide one service feature.
Figure 3:
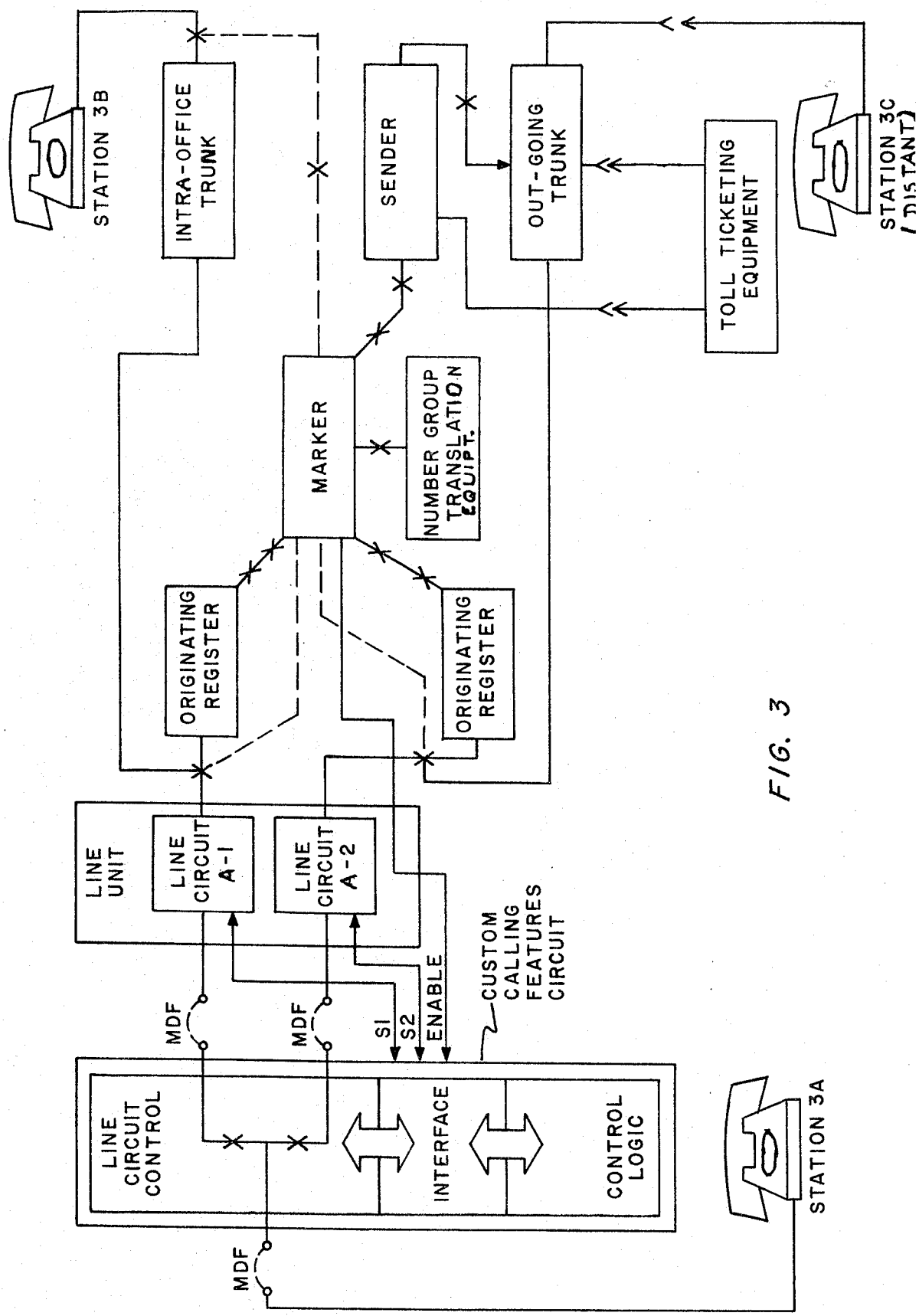
FIG. 3 is a schematic block diagram of the apparatus of FIG. 1 within the system of FIG. 2 to provide a second service feature.

The line control circuit 12 and the interface circuit 14 are connected to the telephone system at the MDF and these circuits act to interface and buffer the logic circuit from the exchange circuitry. Thus, the line control circuit or transmission circuit is connected through leads T and R to the subscriber to which the service features are being supplied. The line control circuit also connects to the two line circuits used to supply the two ports necessary for the services involved. These line circuits may be any conventional line circuit in use in electromechanical telephone systems, as shown. The interface circuit also has connections to the respective line circuits and to the line unit which may be part of the marker (FIGS. 2 and 3). All the connections noted are connected across the MDF by whatever connection techniques are used in the system, jumper wires or the like. Thus an apparatus can readily be applied to a line to provide the service and removed from the line if the service features are to be changed or discontinued.

The logic circuits 16, 18 and 20 should be identical in size and terminal locations to plug in for connection to the circuit of the interface card interchangeably. Mechanical or packaging techniques for providing such interchangeability are of course well-known in the art especially with the use of integrated circuits.

The line circuits designated No. 1 and No. 2 in FIG. 1 includes a line relay and various contacts controlled by the known cut-off relay in a known manner. These are shown by contacts labeled CO which are responsive to a known cut-off relay. The line relay (L) operates in response to an offhook condition of that line. The CO relay operates upon register attachment on an originating call; or when a waiting call appears at line circuit 2, the CO relay must operate immediately to prevent a dial tone demand when the custom calling services subscriber switches to that line to answer the waiting call.

The two special service features provided are best explained relative to FIGS. 2 and 3 for the call waiting and three-way calling features respectively.

In FIG. 2, we show how the call waiting feature is implemented through a known electromechanical telephone exchange of the type shown in the previously noted U.S. patent to E. Erwin et al.

In FIG. 2, we show a station 2A which has subscribed for the call waiting feature and to which an apparatus such as that of FIG. 1 using logic circuit 16 is applied. Assume that Station 2A has called and is in conversation with Station 2B. In completing the call, line circuit No. 1 representing Station 2A had seized an originating register 30 to receive dialed digits. The register seized a marker 32 and number group translator 34 to forward the call to the called Station 2B, Station 2B being a station in the same exchange as Station 2A. With the call being a local call, an intra office trunk 36 is allotted to handle the call and the call is completed. The marker, number group translator and originating register release after their function has ended and these call completing circuits are available to service other calls. If station 2B is idle, the station responds and a conversation path is completed between Station 2A and Station 2B.

If, while the conversation path remains complete, another local station, Station 2C places a call to Station 2A, the line circuit of Station 2C seizes an originating register 40 to receive dialed digits and a marker and number group translator are seized to process the call. From the marker through the office line unit, an enabling lead is signalled leading to the interface circuit. The marker attempts to set an intra-office trunk to supervise the call and finds the called line busy. However, the class of service of the busy line would indicate that custom calling (call waiting) service is provided for this subscriber and the auxiliary line should be tested. The marker initiates a retest through the complementary level, and if the line is idle, the sleeve lead (S2) of the second line appearance of Station 2A is not grounded.

The auxiliary line circuit (line circuit No. 2) allocated for the custom calling features is tested and found to be idle. The marker completes the call from Station 2C through intra-office trunk 42 to line circuit No. 2 of Station 2A. When the trunk to line connection is made on line circuit 2, sleeve 2 is grounded by the action. The presence of ground on sleeve 2 signals the custom calling adapter of a waiting call.

The call waiting circuit 16 applies tone to station 2A (as will be explained). Station 2A after hearing the tone may flash his hookswitch to place station 2B on hold, and stations 2A and 2C can converse freely.

The operation of FIG. 3 to provide three way calling is somewhat similar to that of FIG. 2 in the call setting up phase. With station 3A having called local station 3B, line circuit No. 1 of Station 3A has seized an originating register, and a marker and number translator have been designated to process the call. With station 3B idle, an intra-office trunk is allocated to handle the call and a conversation path is completed.

If station 3A wishes to have station 3C join the conversation in a three-station conference with station 3B, station 3A flashes his hookswitch to place station 3B on hold. Line circuit No. 2 is activated to seize an originating register and receive dialed digits from station 3A and a marker and number group translator are accessed. When line circuit No. 2 is activated, lead S2 is grounded.

When a call for a third station is identified as an outgoing toll call, a sender is seized to feed calling data through an outgoing trunk to station 3C at a remote exchange. Toll ticketing equipment is connected to monitor the call to station 3C.

With station 3B on hold, the call is completed from station 3A to station 3C at the remote exchange, and station 3A and 3C may converse in privacy. When it is determined that station 3B should re-enter the call, a hookswitch flash by station 3A adds station 3B to the conversation which then may continue.

Figure 4:
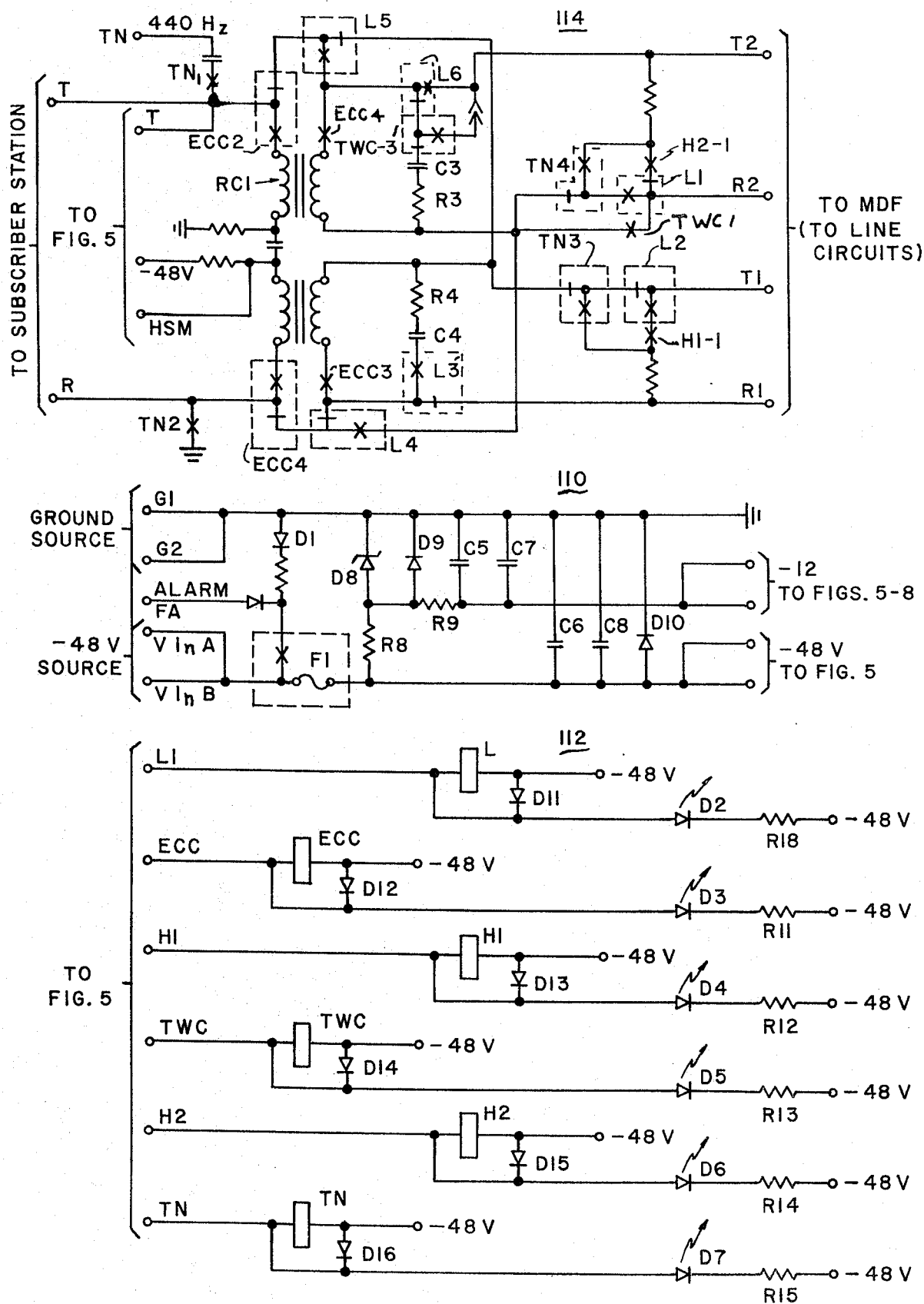
FIG. 4 is a schematic circuit diagram of the line circuit control of FIG. 1.

Turning now to the individual circuits of the apparatus, FIG. 4 shows the line circuit control or transmission circuit to supply all power to the custom calling adapter and also to control all switching on the line circuit.

The circuit of FIG. 4 is divided into three sections: Power Supply 110, transmission relays 112 and transmission switching network 114.

LINE CIRCUIT CONTROL

The conventional office battery is fed to the circuit of FIG. 4 and decoupled through a network comprised of diode D10 and capacitors C6 and C8. The office battery is then passed through zener diode D8 and resistor R8 to produce the 12 volt power supply. The 12 volt power supply is then decoupled through a network comprised of diode D9, resistor and capacitors R9, C5 and C7. The office battery is also fused through the board and if for any reason F1 blows, LED D1 will light and lead FA will be marked with −48 volts.

This transmission relay group 112 includes six relays identified as L, ECC, H1, TWC, H2 and TN, the letters representing the lead to which the relay winding is connected. The operating circuit to each relay is identical, thus, only one need be explained.

Figure 5:
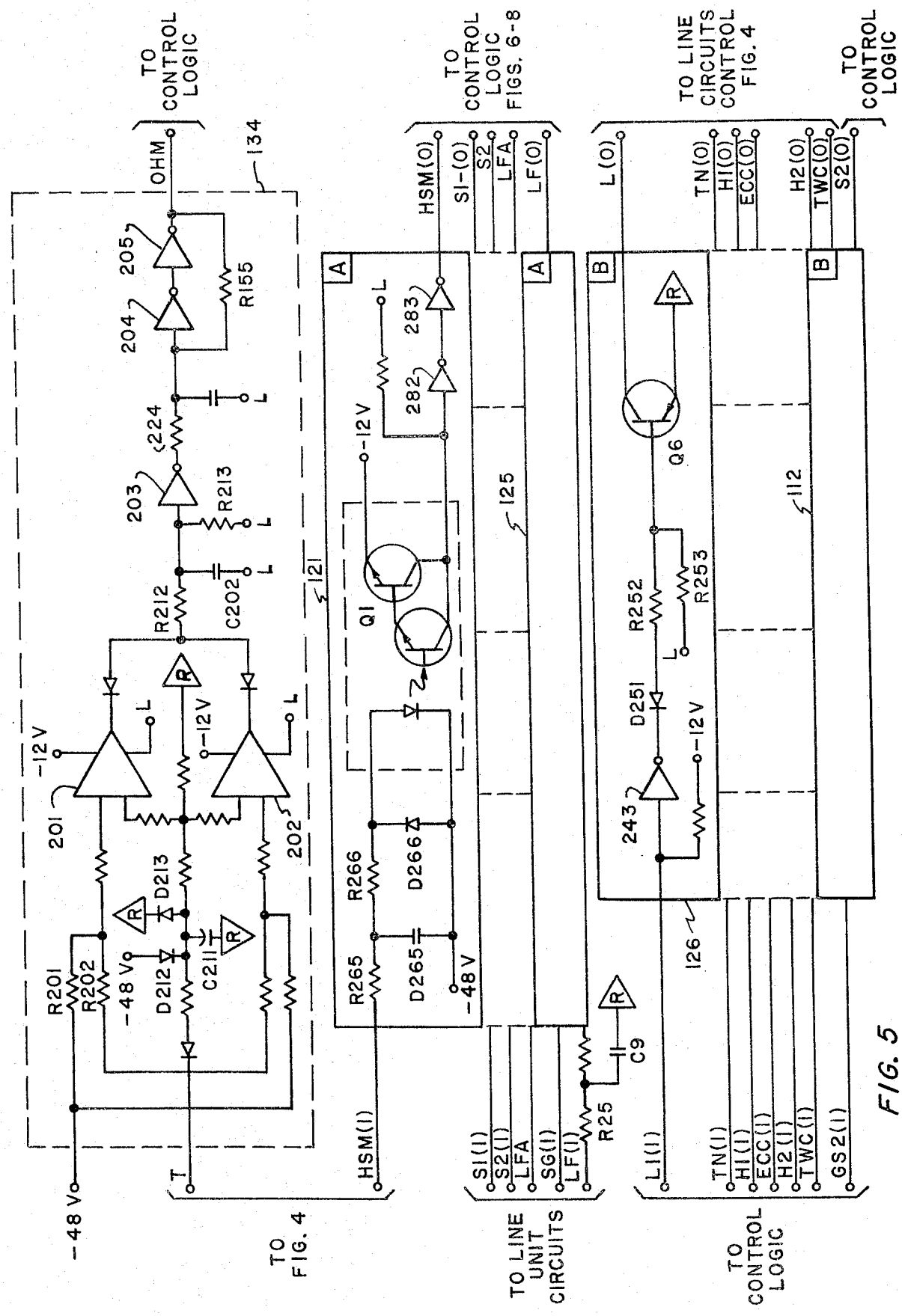
FIG. 5 is a schematic circuit diagram partially in block form of the interface circuit of FIG. 1.

A ground input on any one of these leads from the interface of FIG. 5 will cause that relay to operate, close a current path to the associated LED which will be illuminated.

The transmission circuit 110 includes one repeat coil RC1 with three ports, each port having an impedance of 900 ohms. Included also is the relay logic necessary to control the line unit in the custom calling services. The normal path for the present custom calling apparatus or adapter is by way of the T and R lead bypassing repeat coil RC1 out to the T1 and R1 leads. For example the T lead has a normal path through the normally closed contacts of ECC contact 2, normally closed L relay contact 5, normally closed TN relay contact 3, and normally closed L contact 2 out to the T1 lead. When the ECC contact closes, all DC paths to T1 and R1 leads will be blocked and only an AC coupling will be allowed through transformer RC1.

When the L relay is operated, the transmission or AC coupling is transferred from T1 and R1 leads at line circuit No. 1 to the T2 and R2 leads to the auxiliary line circuit No. 2. Resistors R5 and R6 and the associated contacts in that path are used as a loop hold path, assuring that when one station is talking on the other loop (T1, R1) the station on the T2, R2 loop is placed on hold until those associated relays have dropped. Resistors R3, R4, and capacitors C3 and C4 are used as padding to assure the same transmission at both ports. The TN relay on the tip and ring side of the subscriber line is used to input a 440 Hz call waiting tone to the subscriber isolating this tone from ports T1 and R1 and T2 and R2 by the normally open contacts of TN contact sets 3 and 4.

INTERFACE

Figure 6B:
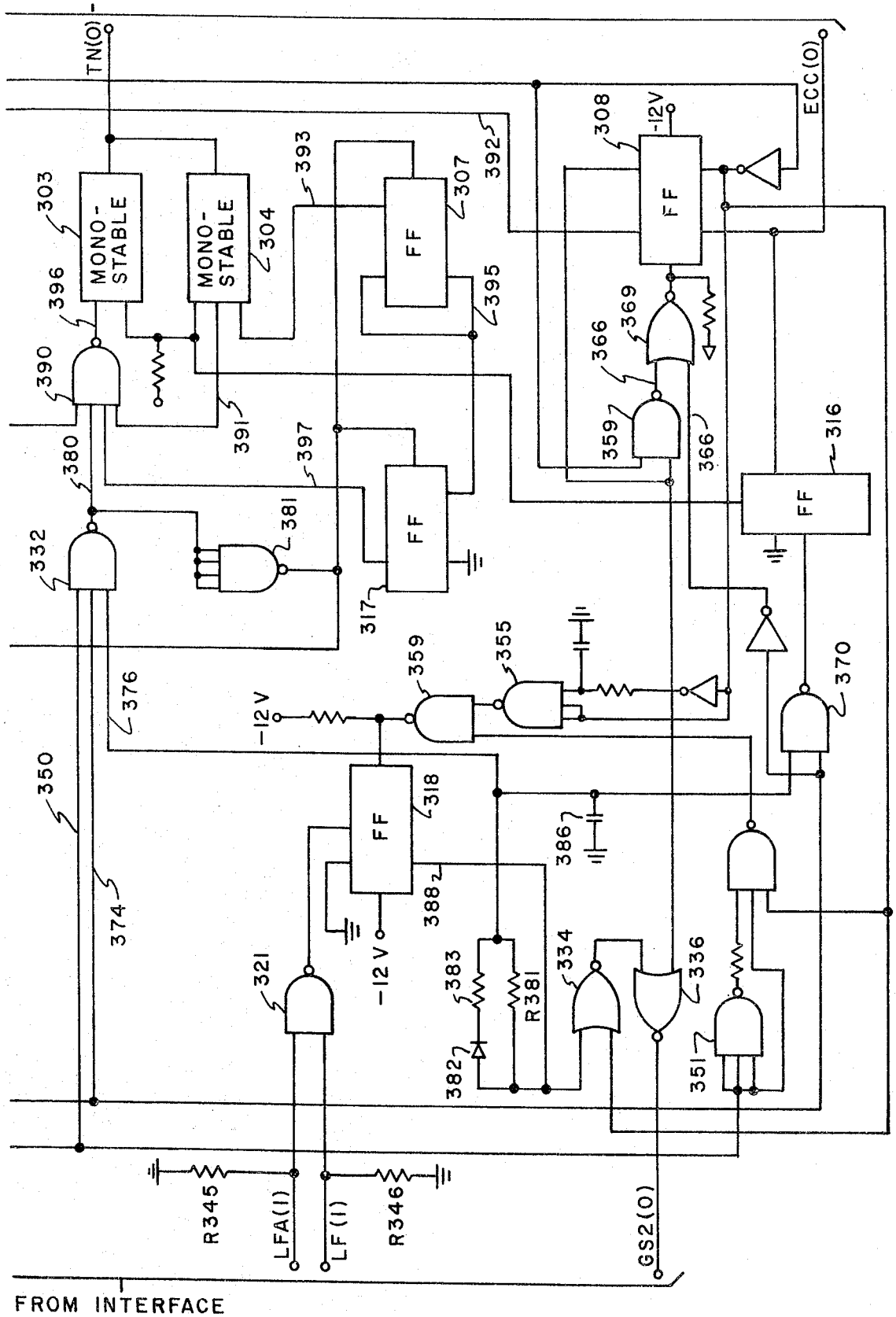
FIG. 6 is a chart showing the relative positioning of FIGS. 6A and 6B to form a schematic circuit diagram for the call-waiting feature of FIG. 1.
Figure 7A:
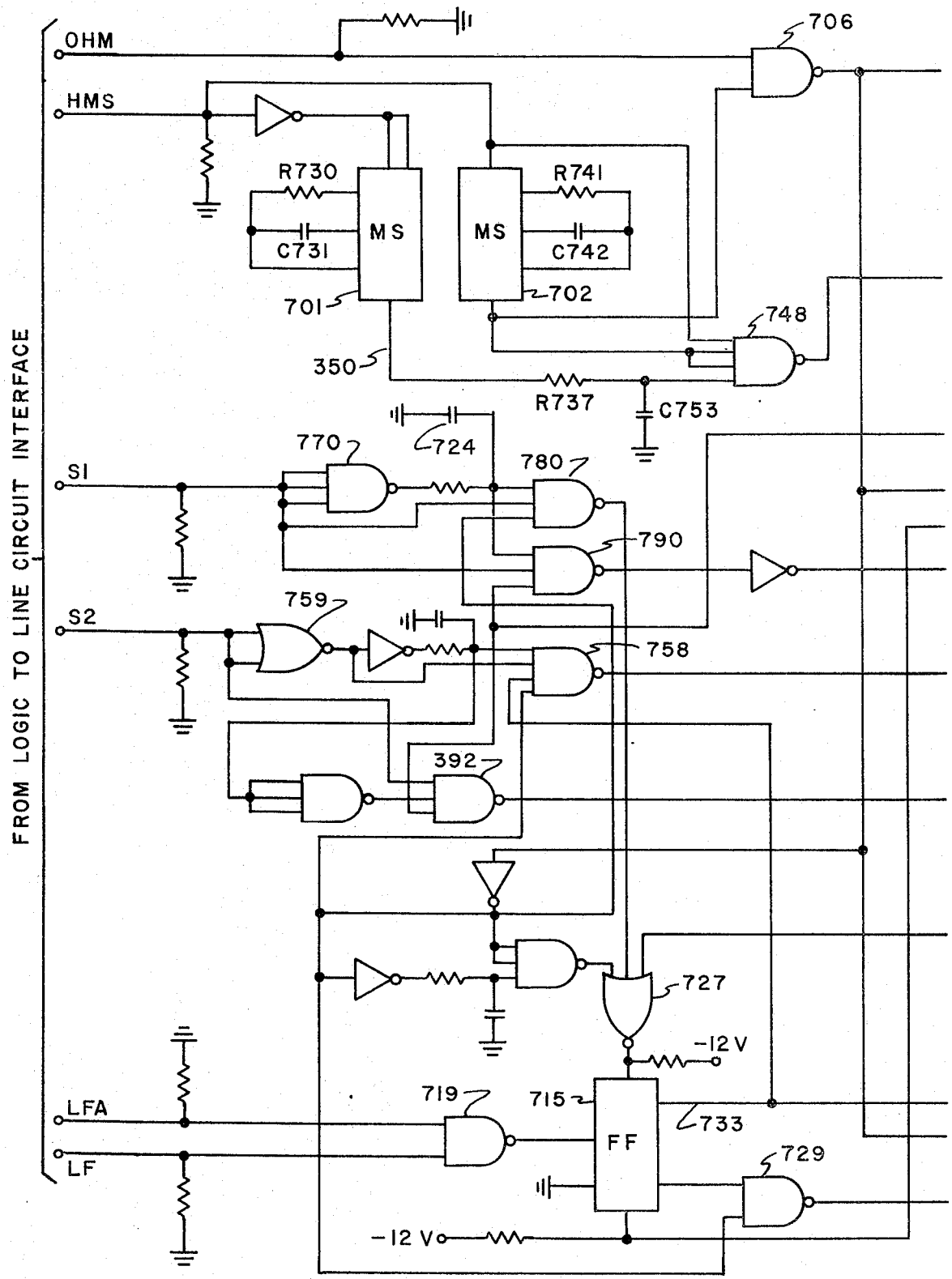
FIG. 7 is a chart showing the relative positioning of FIGS. 7A and 7B to form a schematic circuit diagram for the three-way calling feature of FIG. 1.
Figure 7B:
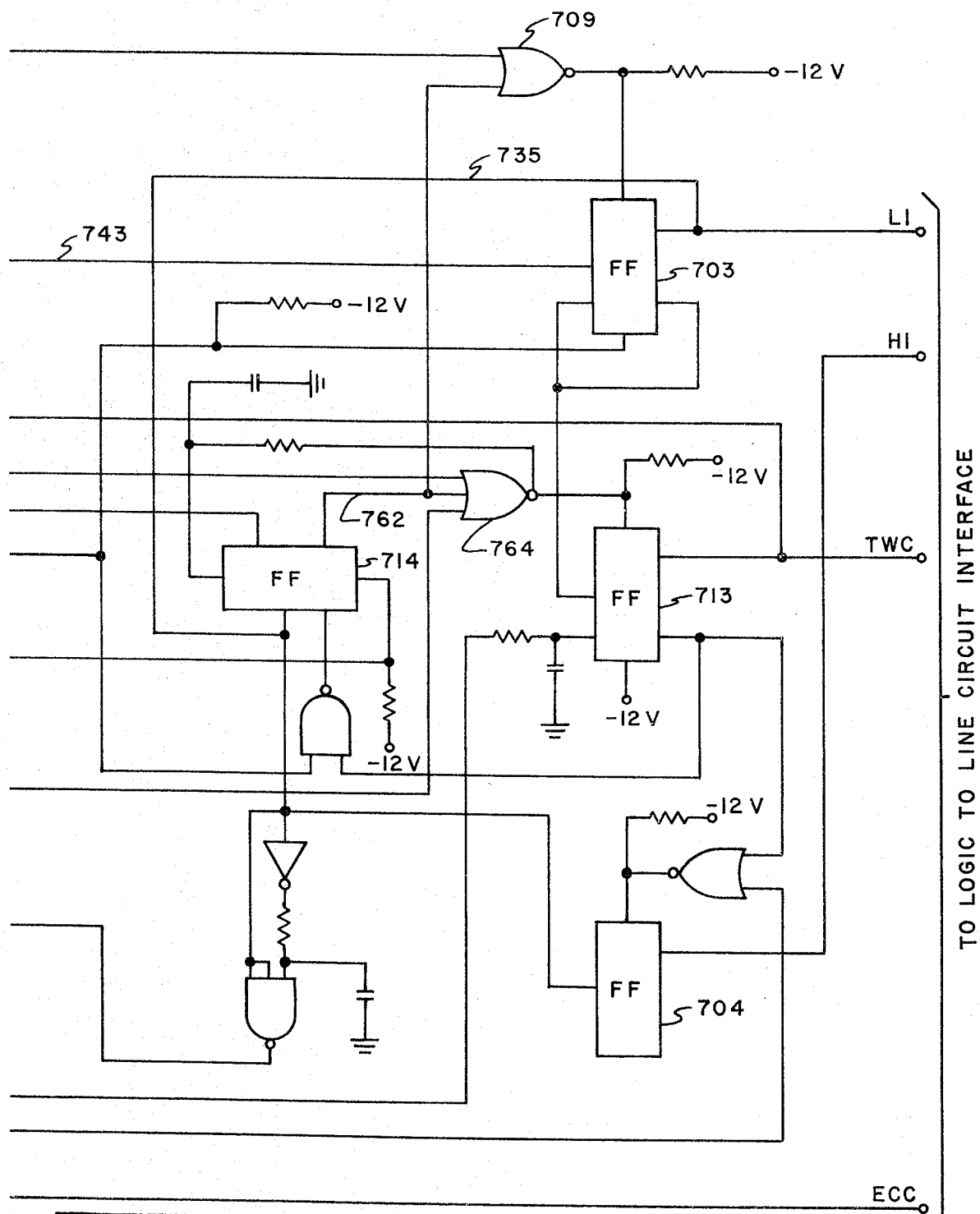
Figure 8A:
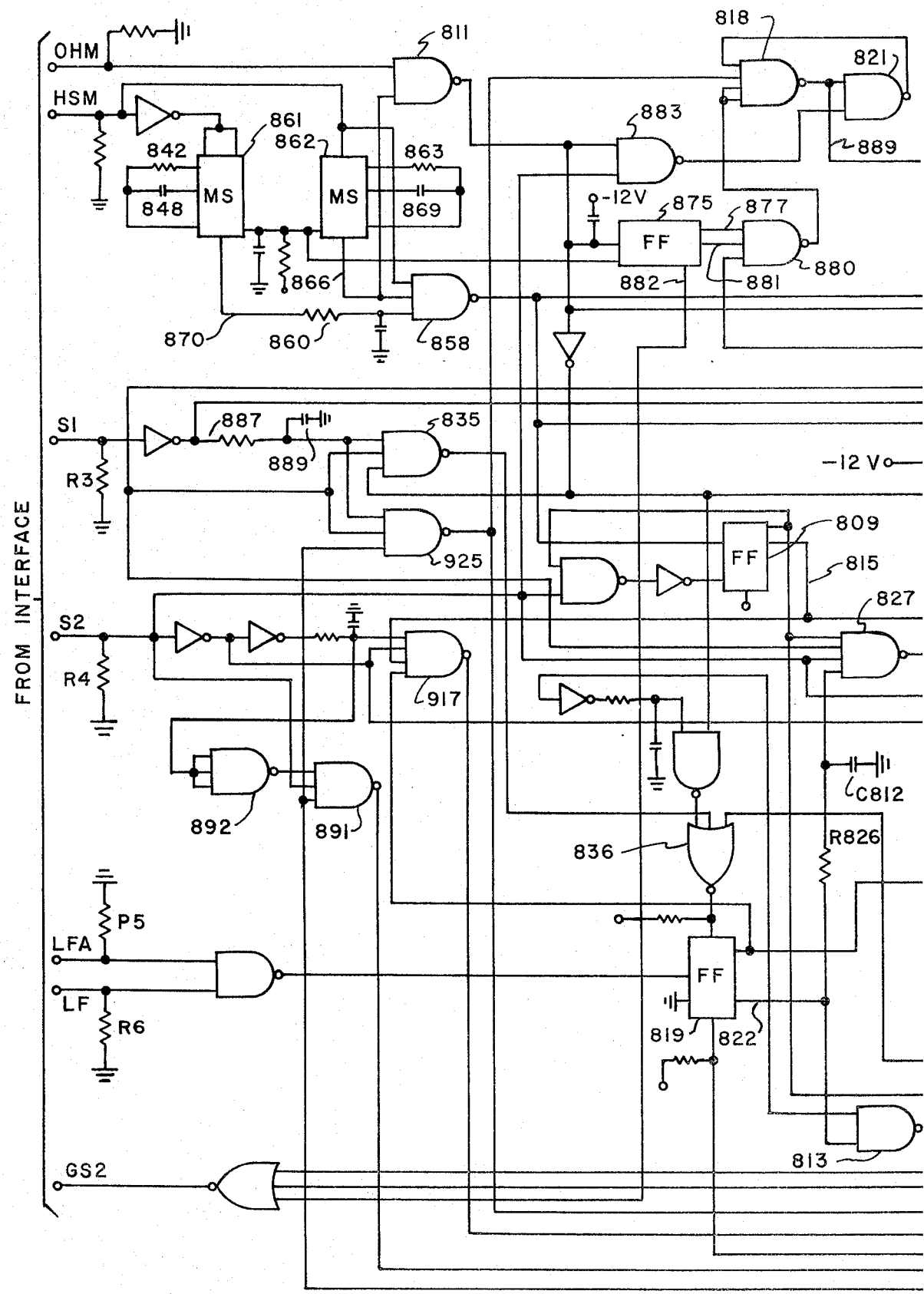
FIG. 8 is a chart showing the relative positioning of FIGS. 8A and 8B to form a schematic diagram of circuit to provide both features - three-way calling and call waiting.
Figure 8B:
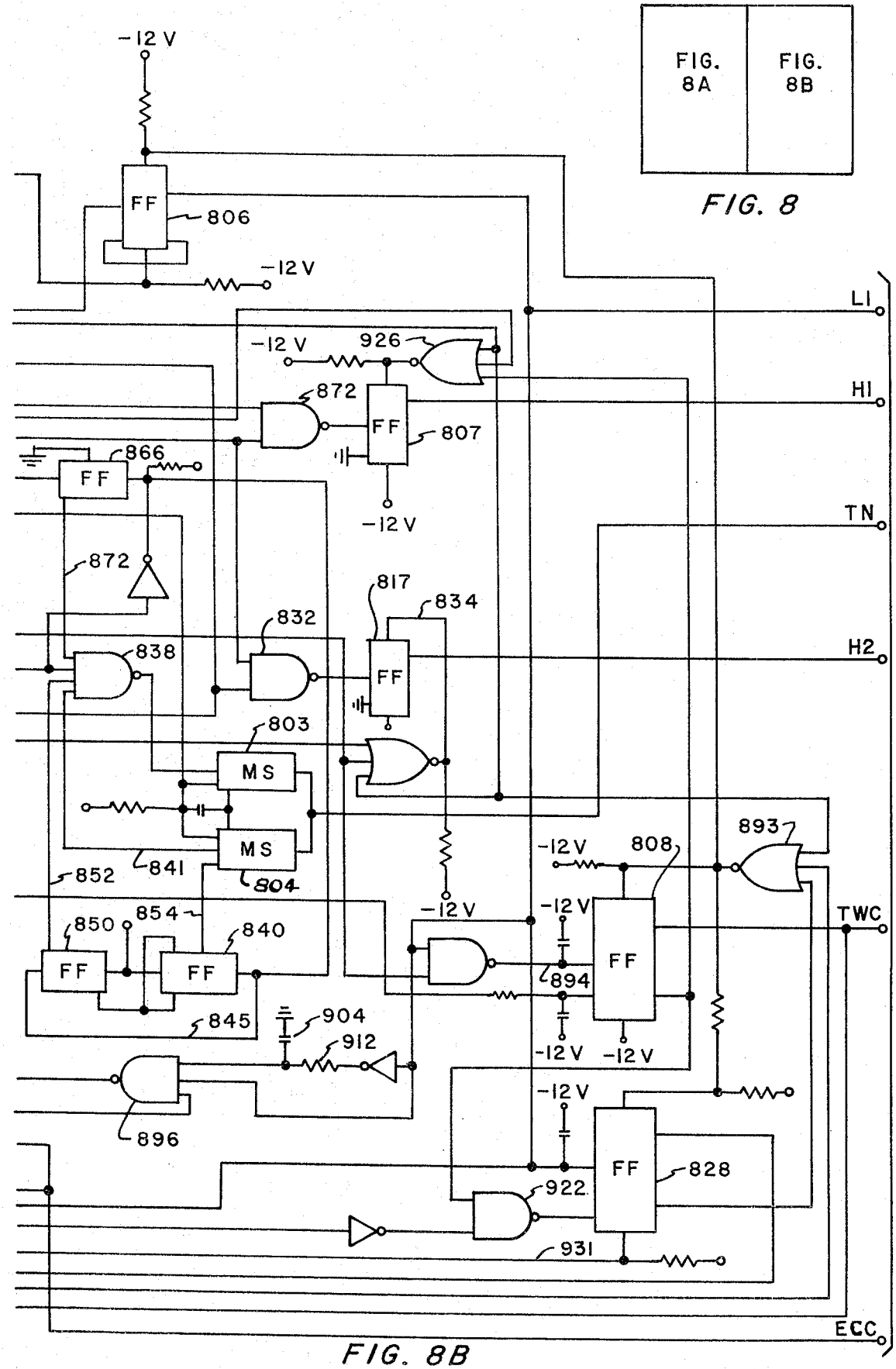

The interface circuit of FIG. 5 includes (1) five optical isolator circuits 121–125 (one of which is shown in detail and another in block form) to interface directly between the relay logic of FIG. 4 and the IC logic of FIGS. 6, 7 or 8; (2) seven integrated circuits 126–132 (only one of which is shown in detail) and another is shown in block form to convert the IC logic to relay logic, and a dual limit detector is shown for use as an on-hook and off-hook detector 134.

The on and off-hook detector 134 is a dual limit detector including two operational amplifiers using reference voltages such that on-hook and off-hook conditions can be detected with as much as a 1900 resistance in the loop. To keep within the operating characteristics of the operational amplifier, all voltages are divided by a factor of five. For example, the reference voltages supplied to amplifier 201 based on the voltage divider comprised of resistors R201 and R202 is 9.01 volts. Multiplying this voltage by 5 equals 45.05 volts. With the reference voltage applied to amplifier 201 at 9.01 volts, and the T lead at ground the output of amplifier 201 will be at ground level. On the other hand, with reference voltage for operational amplifier 202 at approximately 0.8 volts, and T lead being at ground, the output of amplifier 152 will be at −12 volts.

As stated relative to the reference voltages, the input voltages are also divided by a factor of 5. The input is also clamped with diodes D212 and D213 to −48V and ground, thus, assuring no input greater than these voltages will appear to the inputs of amplifiers 201 and 202. Capacitor C211 acts as a small decoupling device. The outputs of amplifiers 201 and 202 go directly into a timing network including resistors 232 and 233, and capacitor 202.

The input circuitry produces a fast charge device and the output provides a slow discharge through a process as follows: The T lead receives −24 volts which when divided by five appears approximately −4.8V to the input of amplifiers 201 and 202. With the reference voltage to amplifier 201 being 9.01 volts, the input is still more negative than the amplifier reference, and thus its output remains at ground level. On the other hand, the input to amplifier 202 has become more negative than its 0.8 reference, thus allowing the output of the amplifier to change from −12 volts to ground. This ground signal then proceeds through a timing network made up of resistor 212 and capacitor C202 charging up to the threshold of gate amplifier 153 at a time constant of approximately 200 ms. Resistors R154 and R155 and capacitor C3 are used to speed the operation of plural series amplifiers 203, 204 and 205, thus allowing no oscillation on the outputs of the inverters. When the T lead goes back to ground, the output of amplifier 202 will go back to −12 volts causing the timing network made up of resistor R213 and capacitor C202 to slowly discharge over a period equal to approximately 1.0 sec.

A second section of FIG. 5 is used to provide an interface between the IC logic and relay logic. Seven circuits 126–132 are provided in this section, the circuits being identical, thus only one circuit 126 will be described. Input on lead L1 which is the L input is at IC logic of either −12 volts or ground. With a −12 volt input, the output of amplifier gate 243 will be sitting at ground level with blocking diode 251 stopping any current flow. The ground through resistor R253 will keep transistor Q6 shut off, thus no output will appear on output lead L. With a ground input on input lead L1, the output of amplifier 243 switches to a level of −12 volts. Now with current conducting through diode 251 and resistor 252, base current flows through a transistor Q6 turning it on allowing a ground signal out on lead L to produce the conventional L output.

A relay logic to IC logic interface is also provided by this circuit using five identical circuits 121–125 for which only one need be described. This interface may be explained as follows: With input on lead HSM-I either at −48 volts or open, no current is flowing through the optical isolator Q1. With Q1 turned off, the input to gates 282 and 283 is at a ground level. Thus, being inverted twice and allowing a ground output on HSM-O, the state of the HSM input is switched to ground. Current now flows through optical isolator Q1 and is differentiated by the resistors R265, R266 and the capacitor C265 to produce a time constant of approximately 15 ms ± 10%. Diode D266 is used as a suppression network when optical isolator Q1 is turned on to provide a −12 volt level input to amplifier 66 which is inverted twice to produce a −12 volt level on the output lead HSM-O.

The final optical isolator circuit 125 in the network has two input leads SG and LF-I. Leads SG and LF leads are both open, thus assuring that a ground signal must be applied to the SG lead and a −48 volt signal applied to an LF lead to allow an output from the isolator of that stage. If either signal is missing, the output of the isolator will remain at ground as the circuits above this output are also inverted twice assuring a ground output on the LF lead. When both signals are applied, both are differentiated approximately 10 ms ± 5%, causing their optical isolator to turn on to a logic level −12 volts. The output of this stage is inverted twice assuring a −12 volt output on the LF-O lead.

The optical isolator for the respective networks 122–125 on leads S1, S2 and LFA operate in the same manner described for transistor S, except very little current is needed to turn on the isolator shown. With a −48 volt input on the HSM lead, isolator Q1 remains off, thus a ground signal on the input amplifier 283 is inverted twice assuring a ground output on HSM-O lead. When −44 volts is applied on the HSM-1 lead, the input is then differentiated through resistors R265, R266 and capacitor C265, thus assuring a 10 ms time interval on the output of isolator Q1. When isolator Q1 is turned on, the logic level −12 volts is present on the input of amplifier 283, being inverted twice assuring a −12 volt level on the HSM-O lead.

CALL WAITING LOGIC

The circuit of FIG. 6 controls the logic for switching required to provide the Call Waiting feature. The circuit is comprised of CMOS logic capable of being mounted on a single PC board and receives power from the −12V supply.

The circuit contains six inputs as received from the interface circuit and six outputs directed to the interface circuit. The inputs include (1) Lead OHM(I) or on-hook memory used to determine the disconnect of circuit to reset all flip flops to their static state; (2) Lead HSM(I) or hook switch memory which monitors the hook switch on the station telephone; (3) Lead S1(I) or sleeve one input which monitors the condition of the sleeve of the station; (4) Lead S2(I) or sleeve two which monitors the second appearance sleeve; (5) Lead LFA(I) or terminating class of service and line idle which determines when the custom calling adapter should be enabled; and (6) Lead LF(I) or sub level group which verifies that a connection has been made by the station or to the station.

The outputs include (1) Lead L(O) or line output to control which of the two line appearances the subscriber has in use; (2) Lead H1(O) or hold path one which is capable of holding the line circuit up on line appearance one; (3) Lead H2(O) or hold path two which is capable of holding line circuit two on line appearance two; (4) Lead TN(O) tone lead. This lead puts out a 300 ms ground pulse signal with a 10 second interval. A maximum of two ground pulse signals provides ground seizure. The purpose of this tone is to alert the station to a call waiting condition; (5) Lead ECC(O) or enable custom calling which tells that there are two seizures to the line and enables the custom calling adapter to accept the call. At the same time, this lead isolates all DC paths to the station and allows the station to be only AC coupled into the line circuit; (6) Lead GS2(O) or ground sleeve two to provide a ground on sleeve two to prevent another call appearing on the second appearance until the circuit is enabled. This sleeve is also removed on a forced connection.

To explain the circuit of FIG. 6, an originating call will be followed and process the call. On an off-hook status of the station, after approximately 200 ms, the OHM lead goes to a low condition. (A low condition is defined as −12V while a high condition is defined as ground). With this low condition on the OHM lead, the input on lead 302 to gate 309 goes low. Gate 309 which is a two input NAND gate goes high on receipt of the low condition on its input lead 302. The resulting high condition will enable the following monostables and flip flops: MS303, MS304, FF305, FF306, FF308, FF310, FF316, and FF326.

The OHM lead going low enables all these flip flop circuits for possible operation; the OHM lead going high for a period greater than 1.2 seconds causing a disconnect to reset these flip flops. The station completes dialing and makes a connection in the office. At this time, both LFA and LF leads go low. These inputs cause a signal to be passed by NAND gate 321 to FF318 to operate the flip flop. The output of the flip flop 318 on lead 322 goes low, going through time constant comprised of resistor R330 and capacitor C331. The low condition enables gate 332 and gates 334 and 336 and removes the signal on the GS2 lead.

Once flip flop 318 has been set, the custom calling appearance adapter is ready to accept the call on the second line. Sleeve 1 had been grounded by the station line, placing the low condition on lead S1. This low condition enables the output of flip flop 306 on lead H1(O), the flip flop awaiting a low condition input on gate 342 to set the flip flop. At the same time, the ground sleeve lead S1(I) enables lead 350 to gate 332 causing it to go low awaiting the signal on sleeve lead S2(I) to activate its gate.

On a terminating call, sleeve lead S1 remains grounded on the connection and a low condition is put on the S1 lead. The OHM lead is in a high condition signifying disconnect, and removal of the S1 signal puts a small one shot out on the output of gates 351 and 355 causing the gate output to go low making gate 359 go high for that period resetting FF318. This covers on originating call which the OHM lead is under control of a local station as is the S1 lead. With the circuit enabled, lead S2 goes to a low condition leading to a number of simultaneous occurrences.

The first response to the low condition on lead S2 will be to enable flip flop 326 through gate 320 and its output 361 to lead H2. Also gate 370 is enabled to set flip flop 326, putting a high signal out on the ECC lead to indicate that a second party has been added to the line. At this same time, the force connect flip flop 308 is enabled. Now that all inputs on gate 332 over leads 350, 374 and 376 are low, a high condition is presented on lead 380 over the No. 1 line. This high condition produces an output from flip flop 315 on lead 384 over a path through gate 381 to flip flop 315. Gate 381 also triggers flip flops 307 and 317 when all inputs to gate 390 are in a high condition. The output of gate 390 goes low triggering monostable 303. Monostable 303 goes to a high condition for a timed period of 300 ms.

At the end of the 300 ms. period, a high-to-low transition occurs to trigger monostable 304 causing a 10 second low condition to be sent out on lead 391 from the monostable to gate 390. This 10 second low period assures that input lead 396 to monostable 303 will stay in a high condition and will not retrigger the monostable. An output from lead TN at this time operates relay TN in FIG. 4 to cause a tone to be emitted to the line. At the same time, that lead 391 of monostable 304 went low, lead 393 went high activating lead 395 of flip flop 307 enabling it to a low state. This low state was transmitted over to lead 395 to flip flop 317 and enabled flip flop 307 to activate lead 397 on the next high transition. After the output of the monostable 303 had gone through its 10 second interval, it goes back to a high condition setting monostable 303 and retriggering the monostable one more time to a 300 ms. period. At the end of this period, once again, monostable 304 is triggered. Lead 393 is triggered a second time, and will set flip flop FF307 to produce an output on lead 395 once again setting flip flop 317 to produce an output on lead 397, putting a permanent low condition on the input lead to gate 390 to prevent gate 390 from retriggering at this time.

The HSM lead is the input which has control of flip flop 305 to control the line relay operation. Components 301 and 302 are both monostable circuits with the configuration of 301 being retriggerable. The time constant of the RC combination of resistor R319 and capacitor C324 being 200 ms prevents any signal less than 200 ms. duration from triggering monostable 301. Thus, the input signal on lead HSM must go high for a period greater than 200 ms to produce an output from monostable 301 on lead 341, representing a state change of of the monostable.

At the same time, monostable 302 triggers and its time constant determined by the combination of resistor R360 and capacitor C365 produces a 1.2 second monostable output. This output is fed into gate 312 when all three gate input conditions are met responsive to a pulse duration greater than 200 ms. but less than 1.2 seconds. As a result, the output of gate 312 will go to a high condition for a period equal to the time constant of the combination of resistance R372 and capacitance C371. This high transition will set enabled flip flop 305 to produce a high condition on lead L2 through the interface of FIG. 5 and as a result will trigger transistor Q6 and pull the L relay in the line circuit control.

At the same time that FF 305 of FIG. 6 is set, flip flops 306 and 326 would also be set and produce a pulse, if the S1 and S2 leads had produced a low condition on the inputs of gates 320 and 342. This pulse would also trigger flip flop 315 to produce a low condition on the output lead 384. This low condition on the output on lead 384 would assure that monostable 303 would not retrigger and act to terminate the TN output to relay TN of FIG. 4.

As many times as the input of HSM lead goes to a high input between the period of greater than 200 ms. and less than 1.2 seconds, the output on lead 384 of FF315 would change states. The first time it was set, the output on lead L1 of FF305 would go to a low condition. This setting could continue as long as required. The only act that would terminate the setting or activation is the disconnect signal on the OHM lead. If after the second sleeve was grounded or if the S2 lead went low and an HSM input signal was not activated, but instead the OHM lead went to a ground condition for a period greater than 1.2 seconds (as determined by the output of monostable 302 on lead 311), the output of gate 309 would then change the condition on input lead 348 of gate 340 to a low state. A low on an input of gate 359 over lead 348 resets flip flops FF316, FF308, 310 and 318 and resetting MS303 and 304 preventing any triggering of the monostables.

As the time gate 309 went low, it enabled the input to gate 340. With input 349 low, and the input to gate 359 low, the output of gate 359 went high. This high condition on the output of gate 359 coinciding with a high condition on the input 366 of gate 369 caused its output to change to a low state, allowing FF308 to be set if the ECC lead to FF308 were in a high condition. When lead 396 at the input to MS303 went high, activating the output of FF308 on lead 392, causing it to go low. This low through gate 340 causes a high condition on the set lead of FF305. The set lead will force the output on the L lead of flip flop 305 to go high, this being called a forced connection to the second line appearance. If for any reason the S2 lead went to a high condition, the output of NOR gate 369 would go to a high condition causing FF308 to be reset and dropping FF305 back to its normal or low condition.

If the S2 lead did not go low, the L relay remains high until the OHM lead goes to a low condition. A low condition on lead OHM causes the output of gate 309 to go high causing a low on the ouput of gate 359, thereby resetting FF308.

Resistors R343 through R346 are clamping resistors assuring that no CMOS lead is unterminated when the board is unplugged. By providing resistors on the set and reset leads of the flip flop, we assure a slight decoupling to provide transient free operation.

The output of the FF318 lead 322 has a timing network comprised of resistor R381 in parallel with the combination of diode D382 and resistor R383, these being in series with capacitor 386. Resistor R381 has a much higher value than R383, thus when FF318 first went to a low condition, diode 382 blocks current flow and the path must follow resistance 383 and capacitor 386 causing a slow-to-charge condition. When lead 388 goes to a high condition, it is bypassed through diode D382 and resistor R388 causing a fast discharge path.

Gates inputting on the reset leads to FF318 such as gate 355 are used as one shot devices where the time constant is dependent upon resistor and the capacitor combination to the input of the last gate 359, i.e., when the input from gate 359 is clamped through a capacitor to ground and through another gate to resistor R383. This RC network would determine the time constant of the one shot. The circuit has been designed so that all devices should be in their static state on a power-on condition. Further, the circuit is configured so that removal of any card in the system will not affect a station on its normal line circuit operation, as this only cancels the custom calling portion of the circuit.

THREE-WAY CALLING LOGIC

The circuit of FIG. 7 provides the switching logic to provide only the three-way calling feature. The circuit comprises a CMOS integrated circuit and is operated by a −12 volt power supply. The power supply is suitably decoupled to provide transient free operation. The circuit fits on a plug-in PC board which replaces the circuit of FIG. 6 by having the same input connections to the interface circuit to which it connects in plug-in fashion.

The circuit of FIG. 7 contains six inputs and four outputs directed to the interface (the GS2 input lead of FIG. 6 is not used by the three-way calling feature circuit). The inputs to the circuit and their function is generally as follows: (1) OHM or on-hook memory to determine the disconnect of the circuit and reset all flip flops to their static state; (2) HSM or hook-switch memory to monitor the hook-switch on the station's telephone instrument; (3) S1 or sleeve one input to monitor the sleeve of the main line circuit appearance of a station; (4) S2 or sleeve two input to monitor the second appearance sleeve; (5) LSA or terminating class of service and idle line to determine when the custom calling adapter should be enabled; and (6) LF or sub-level group to verify that the connection has been made by a station or to a station.

The outputs of the circuit of FIG. 7 are as follows: (1) L1 or line output to control which line appearance the subscriber has in use; (2) TWC or three-way calling connection to determine when a conference call has been sent to the adapter; (3) H1 or hold path one to hold a line circuit on line appearance one; and (4) ECC or enable custom calling to indicate the circuit is enabled to complete the three-way call. All the circuits in the adapter are enabled at this time.

An originating call will be followed as processed to complete a three-way call through the circuit of FIG. 7.

On an off-hook condition, the OHM lead goes to a low condition after approximately 200 ms, a low condition again being defined as −12 volts and a high condition being defined as ground. With this low condition on the OHM lead, the output of gate 706 goes high. This condition will enable the following flip flops to be enabled to respond to subsequent response pulses, FF703 through NOR gate 709 to produce an output on lead L1, flip flop FF704 with its output on H1 (or hold for line one); the OHM lead also enables the three-way calling flip flop 713 with its output on lead TWC, flip flop 715 (the ECC flip flop), and FF714 which is used as a control flip flop, but their clocking is determined by other functions in the circuit as well, and will be explained at a later time.

A subscriber dials and makes his connection to the central office. At this time, the LFA and LF leads go low to produce an output on gate 719. FF715 is set, the output of gate 719 with the other input to gate 729 which determines the station is off-hook will pull the ECC relay in FIG. 4 through a path through the ECC lead and the section of FIG. 5 to tell the station that he now is ready to originate another call on the second line appearance if he desires.

As the station went off-hook, his S1 lead went to a low condition which provides some control functions in the custom calling adapter. For example, if the call were a terminating call instead of an originating call when the person completed dialing, the S1 lead would have gone to a low condition. If the called station did not answer the phone and the calling party hung up, the S1 lead would have gone to a high condition producing a small one shot ground pulse out of gate NOR 720 when it is determined by the time constant of R723 and C724. This one shot pulse is fed to into NOR gate 727 and causes the output of gate 727 to go high for that same duration of time resetting flip flop 715, and its output on lead 733. This condition takes place only on a terminating call and we were discussing an originating call, so back to our originating call.

Assuming the calling station does wish to add a third party to his conversation, at this time the HSM lead will be discussed since this is the input which has control of FF703 which controls the line relay flip flop. Circuit devices 701 and 702 are monostables with configuration of MS701 being in a retriggerable mode. The time constant of resistor 730 and capacitor C731 being 200 ms prevents any signal less than 200 ms duration triggering MS701. At this stage, the signal on the HSM lead must go high for a period greater than 200 ms to produce an output from MS701 on lead 350. At the same time, MS702 which is in the configuration of a monostable triggers for its time duration of 1.2 seconds which is determined by resistor R741 and capacitor C742. This output is fed into gate 748 and when all three gate conditions are met, i.e., a condition of a pulse longer than 200 ms in duration but less than 1.2 seconds, lead 743 will go to a high condition for a period of the time constant of resistance R737 and capacitance C753. This high transition will set FF703 and lead L1 to a high condition which will in effect pull the L relay in the control circuit of FIG. 4 as previously described.

At the same time that FF703 is set, FF704 is also set over lead 735 pulling the H1 relay in FIG. 4. Also, a small single shot out of gate 727 resets flip flop 715 to a static state knocking down the ECC lead. As FF703 is set the calling station would in effect get another line circuit connected to his adapter. The S2 lead of the adapter as a result goes low.

If for some reason the calling station decided he did not want to originate another call on that line, or he got a wrong number in the midst of his dialing and hung up, the following would occur. The S2 lead would go high causing a small one shot out of NAND gate 758 over a path through NOR gate 759 setting FF714 driving lead 762 high through NOR gate 764, resetting the line flip flop FF703 and also setting the ECC flip flop 715 to allow the station to re-originate on the second line appearance or just remain talking to the original called party. Assuming that the station decided he dialed the wrong number and wanted to re-originate on the second line appearance, he would again mark the HSM lead with a ground for a period longer than 200 ms and less than 1.2 seconds and would pull the line relay flip flop 703 and follow the previously discussed sequence to perform their functions.

When the calling station dials out on the second line appearance and makes a connection to his party, the LSA and the LS leads go low, setting the ECC flip flop 715. The station is now able to set up a conference call or merely complete the conversation with the second station. Assuming that the station does want a conference call, he marks his HSM lead once again with a pulse of duration longer than 200 ms and less than 1.2 seconds. This pulse brings the output of FF703 back to its normal state knocking the L relay down to its normal appearance. As this happens, the output of FF703 is activated, setting up the three way conference and also resets FF704 to output lead H1 to its static state. Now that the station has a conference call set up, the conference remains in this stage as long as desired.

The call may be terminated in two ways — by disconnecting the OHM lead or by hookswitch again by marking HSM lead once again. If the HSM lead was marked once again, this causes FF714 output on lead 762 to be activated causing the line flip flop 703 and the TWC flip flop 713 to go back to their static condition and also sets the ECC flip flop 715 to enable the subscriber to originate another call if desired. If when the conference call was set up and the station did not mark his HSM lead, but for some reason S1 went back to a high condition at this time, NAND gate 770 would trigger to produce an output on gates 780 and 790 in the form of a small one shot which is determined by the time constant of resistor R783 and capacitor C784 and set flip flop FF703 to its high condition which would set the line relay and once again reset ECC flip flop 715 back to its static condition. The same condition would appear if S2 lead were to go high after the conference was set up. A small one shot would appear out of gate 392 resetting the conference flip flop 713 output on the TWC lead.

As with the prior circuit, removal of any cards in the system does not effect a station in its normal line circuit operation. Such circuit card removal prevents or inhibits only the custom calling portion of the circuit.

COMBINATION LOGIC

The circuit of FIG. 8 provides both functions — call waiting and three-way calling — and contains six inputs and seven outputs, the inputs being: (1) OHM, on-hook memory. This input determines conditions for disconnect of the circuit and resets all flip flops to their static state; (2) HSM, hookswitch memory. This input monitors the hookswitch on the station telephone; (3) S1, sleeve one input. This input monitors the sleeve of the main line circuit appearance for the station; (4) S2, sleeve two input. This input monitors the second line appearance sleeve; (5) LFA, terminating class of service idle line. This input determines when the custom calling adapter should be enabled; and (6) LF, sublevel group. This input verifies that a connection has been by a station or to a station.

The output leads from FIG. 8 are as follows: (1) L, line output. This output controls which line appearance the subscriber has in use; (2) H1, hold path 1. This output is used to provide hold on the line circuit on line appearance one; (3) H2, hold path 2. This output lead is used to provide the capability of holding on the line circuit on line appearance two; (4) TN, tone lead. The output lead places a 300 ms duration ground mark at 10 sec. intervals. A maximum of 2 ground marks are sent out per ground seizure. The purpose of this tone is to alert the subscriber to a call waiting; (5) TWC, three-way calling. This output lead determines when a conference call has been set to the adapter; (6) ECC, enable custom calling. This output lead indicates that the circuit is now enabled for completing the setting up of the call whether it be either three-way calling or call waiting. All the circuits in the adapter are enabled at this time; and (7) GS2, ground sleeve 2. This output is used to place ground on sleeve 2 to prevent other calls from being received on the second line appearance during its seizure. A time delay before the restoration of ground on the No. 2 sleeve lead allows a check for force connection, the delay being 500 ms.

COMBINATION LOGIC-CALL WAITING

The operation of the circuit of FIG. 8 is similar to that of both FIGS. 6 and 7 to provide either or both of their functions. The circuit will be explained first relative to an originating call as it is processed through as a call waiting call comes into the present apparatus. On an off-hook condition, the OHM lead, after approximately 200 ms. goes to a low condition, a low condition again being defined as −12V and a high condition being defined as ground. With this low condition on the OHM lead, the inputs of gate 811 go low. On this low signal, the output of gate 811, which is a two-input NAND goes high. This high condition will enable the following flip flops to be set: FF806, the line appearance flip flop; MS803 and 804, the alert tone control monostables; FF807, the hold 1 control flip flop; FF808, the three-way calling flip flop, and FF809, three-way calling or call waiting identification flip flop. The combination of gates 818 and 821 create a multiple input flip flop to force connect. Flip flop 828 provides its output a three-way calling conference control flip flop output.

The off-hook response on the OHM lead also enables other flip flops if other conditions are met, such as output from flip flops 817 to enable Lead H2 if the ID flip flop 809 had identified a call awaiting service at a time when input lead S2 is low.

The OHM lead going low enables all these circuits, while the OHM lead going high for a period of 1.2 secs. will cause a disconnect and reset these same flip flops. Also, the reset enables custom calling flip flop 809 output on lead 815.

The subscriber completes dialing and makes a connection in the office--at which time the LFA and LF leads go low. As this condition happens, flip flop 819 is set, the output of this gate on lead 822 goes low. After a period determined by the constant of RC combination 826 and 812, this low condition enables gates 827 and 813 and removes the signal on the GS2 lead through OR gate 814. Once flip flop 819 has been set, the circuit is ready to accept a call on the second sleeve.

Sleeve 1 had been grounded by the subscriber's line causing a low condition on the S1 lead. This low condition enables flip flops 807 to produce an output on lead H1 awaiting an input on one input of NAND gate 832 to trigger it. At the same time, the low condition enables gate 827 awaiting a signal on sleeve S2 before activation of gate 827. On a terminating call, sleeve 1 is grounded on the connection and a low condition is put on the S1 lead. With the OHM lead being in either a high condition, or the disconnect condition, removal of ground from the S1 lead is a signal that the waiting station has terminated, for one reason he decided that he couldn't be connected to the station involved in the call or for some reason ended the call by going on hook. The disappearance of ground on the S1 lead would then cause a small one shot to be emitted by gate 835. This output would then proceed over to the input of gate 836, and the output from this gate is fed to the input of flip flop 819, resetting flip flop 819.

The present explanation covers an originating call which the OHM and S1 leads are under the control of the subscriber. With the inputs enabled, S2 lead going to a low condition indicates that a call is being sent to the subscriber's second line appearance. A number of occurrences happen at this time as follows.

First, lead 834 of flip flop 817 will be in a reset or low state to enable the output of flip flop 817 to be set and produce an output on lead H2. With the input on the terminals of NAND gate 827 being low, the input to gate 827 from flip flop 809 on lead 815 is also low indicating that the call being checked is a call waiting one and not a three-way call. The output of gate 827 goes high. This high condition passes through the output of gate 844 with all other inputs to this gate being in the high state. At this time, the output of NAND gate 838 will go low, triggering monostable 803, producing a high on terminal TN for a period of 300 ms.

This 300 ms. period is sufficient to allow completion of a high to low transition, following which monostable 804 triggers causing a 10 sec. low output condition on the lead 841 as an input to MS804. This triggering of MS804 high emits an output on the TN lead to TN relay of FIG. 4 to cause a tone output. The 10 sec. low period is used to insure that the output of gate 838 will stay in a high condition and will not retrigger the monostable. At the same time that lead 841 became low, monostable 804 went high setting flip flop 840 to a low state. This low state was transmitted over lead 845 to flip flop 850 and enabled flip flop output lead 852 to clock on its next high transition.

When lead 845 has received its 10 second transition, this lead reverts to a high condition activating the output of gate 832 to retrigger monostable 803 one more time for a 300 ms. period. At the end of this period, once again monostable 804 is triggered. Monostable 804 triggers outputs on leads TN and 854 a second time which will produce a low condition output on lead 855 to set flip flop 850. This resulting low output on lead 855 puts a permanent low condition on lead 852 preventing monostable 803 from retriggering at this time.

The functioning of HSM lead will be discussed now, since that lead provides the input control gate 858 which, in turn, controls the line relay flip flop 806. Monostables 861 and 862 are connected in a configuration such that MS861 is in a retriggerable mode. The time constant produced by resistor 842 and capacitor 848 is 200 ms. to prevent any signal less than 200 ms. of duration from triggering MS861. Stated another way, a signal on the HSM lead must go high for a period greater than 200 ms. to produce an output from MS861 on lead 860. At the same time, MS862 triggers and its time constant produced by resistance 863 and capacitor 869 up a 1.2 sec. monostable. The output of MS862 on lead 866 is fed onto the input of gate 858. When all three gate inputs meet the required condition of a pulse duration longer than 200 ms. but less than 1.2 seconds, the output of gate 858 goes high for a period determined by the time constant of resistance 870 and capacitance 865. This high transition will set flip flop 806 to produce an output on the L lead which will in effect pull the L relay in the control circuit of FIG. 4.

15

At the same time, the output of gate 858 is transmitted to flip flop 866 and gates 872 and 832 to set flip flops 807 and 817 leading respectively to leads H1 and H2. These pulses will also trigger an output from flip flop 860 on lead 872 to a low condition. This low condition on output lead 872 will assure that flip flop 803 will not trigger and terminate the TN output if it has not completed two cycles.

As many times as HSM lead will go to a high input for a period of greater than 200 ms. and less than 1.2 secs. the output of flip flop 806 will change states. For example, the first time flip flop 806 was set, its output on lead L went to a high condition. The second time it was pulsed, its output went to a low condition, etc. The pulse setting of the flip flop 806 will continue as long as desired. The only thing that would terminate the pulsing is a disconnect signal on the OHM lead. After the second sleeve had been grounded, or lead S2 went low, and HSM had not been activated; for example, if OHM lead went to a ground condition for greater than 1.2 sec.

The sequencing is determined by the output of gate 872 responsive to the OHM lead with the input and output of gate 811 being in a high condition, the output of gate 811 will be in a low condition. This low condition will proceed to reset everything on the custom calling adapter back to its idle state. This low condition also triggers monostable 875 to produce a high state on its output lead 877, which is transmitted to the input of gate 880 to produce a 500 ms. high period. This timed period on input to gate 880 will insure that latch gate 818 will remain low for a period of 500 ms., thus assuring a ground will not be forwarded from the S2 lead for that period of time. Lead 877 at the output of gate 875 is the oscillator output out of the monostable and has half of the duty cycle as the outputs on leads 881 and 882, thus, on the triggering of monostable 875, output lead 877 will go high for a period of 250 ms. so that the force connect circuit will not be activated to check sleeve S2 for a period of 250 ms.

After the first timed period of 250 ms. has expired, for a continued period of 250 ms. a high signal will be produced on the output of gate 860 if sleeve lead S2 is grounded. This ground or high signal is inverted through gate 883 setting the two upper inputs to flip flop 888 low. The low signal combined with a low signal from gate 880 insures a high signal on the output of gate 818. This high signal on the output of gate 818 goes over to the set lead 889 of flip flop 806. This set lead input produces a high condition on the L lead. When the output of gate 883 is in a low condition due to the fact that S2 is grounded, and the upper input to gate 885 in a low condition due to the condition of the OHM lead responsive to the station subscriber still on hook. A high signal is present at the output of gate 883 to the input of latch gate 821. Thus when the input of latch gate 818 went high producing a low condition at the upper input of gate 818, this low keeps the set lead 889 of flip flop 806 in a high condition, thus, insuring that a force connection is made.

When a person goes off hook or answers the phone, the OHM lead produces a high condition at the output of gate 811. This high condition then is passed to gate 883 and to the lower input to gate 811. This resulting high condition on the input to gate 811 will force a low condition out on the output of gate 883 over to the lower input to gate 821. This low condition will then cause a high condition at the output of latch gate 821 over to the upper input to gate 818 to produce a force connection which will remain as long as S2 remains grounded.

When the ground is removed from lead S2, this changes the condition at the bottom input to gate 880 insuring that flip flop 818 will be reset and no set condition will be able to exist. The call waiting portion of the circuit is operative either on completion of the call by a hookswitch flash or by force connection.

COMBINATION LOGIC — THREE-WAY CALLING

The most common distinguishing feature between a three-way call and a call waiting is that when a hookswitch has been flashed on a three-way call, the S2 lead will not be grounded. On a hookswitch flash for call waiting, the S2 lead will be grounded. This distinguishing feature is used within the combination logic circuit of FIG. 8 to determine if the customer needs service for either call waiting or origination of a three-way call.

An example of an originating call to complete a three-way call will now be described. Again as the calling subscriber station went off-hook, the OHM lead after approximately 200 ms. went to a low condition. This low condition on the OHM lead causes the output lead of gate 821 to go high. This condition will again enable the same flip flops as discussed in the call waiting portion of the circuit. Again as mentioned previously, many of the flip flops enabled due to an off-hook condition may not be truly enabled unless the calling process is a three-way call or a call waiting depending on which type of call is in process.

For example, on an off-hook condition, input 892 of gate 891 went high and the lower two inputs of gate 893 being high put a low out on the output lead of gate 893 which enables flip flop 808 to be set. But input on lead 494 cannot be activated unless the ID flip flop 809 has identified the call as a three-way call. Thus, in this combination board, flip flop 809 acts to identify which type of services is to function, either a call waiting or a three-way calling and will enable or disable portions of the circuit accordingly.

The subscriber completes dialing and makes connection through the office. At this time, both the LFA and LF leads go low. When this condition happens, flip flop 819 emits an output on lead 822 to enable the custom calling circuitry and inform the subscriber that he may now be ready to originate another call on this second line appearance if he desires.

As the subscriber goes off-hook, his S1 lead goes to a low condition which provides a number of control functions in the three-way calling circuits. For example, if this call was a terminating call instead of an originating call when the calling station completed dialing to the called station, the S1 lead would have gone to a low condition. If the subscriber did not answer the call and the calling station went on-hook, the S1 lead would have gone to a high condition giving a small one shot ground pulse out of the output of gate 835. The duration of this one-shot pulse is determined by the RC values of resistance 887 and capacitance 889 and the pulse is fed to gate 836 to reset to the ECC flip flop 819.

The sequence described takes place only on a terminating call, as contrasted with an originating call which will now be described. Assuming that the calling subscriber station wishes to add a third party to the existing conversation, he flashes his hookswitch to cause the HSM lead to enter a high period of greater than 200 ms. and less than 1.2 sec. caused by the hookswitch flash. This high transition will again set the line relay flip flop 806 to a high condition which will in effect pull the L relay in FIG. 4 over lead L1. At the same time, the H1 lead flip flop 807 is set pulling the H1 relay in FIG. 4. This high condition also is transmitted to one shot gate 896 and produces a small one shot low condition with the time constant of the combination of resistor 912 and capacitor 904. This small low one shot reaches gate 836 to reset the ECC flip flop 819 and in effect restore the enabled custom calling (ECC) relay in the circuit of FIG. 4.

Restoration of the ECC relay allows the subscriber to seize another register, receive dial tone and dial out through the second line appearance. The S2 lead of the FIG. 4 went low at this time. If for some reason, the calling station decided he did not want to originate another call on that line or had gotten the wrong number from his dialing, after the time delay period, lead S2 goes high. The disappearance of the low condition on lead S2 (the S2 lead going high) will cause a small one shot out of gate 917, setting flip flop 828 and thereby resetting the line flip flop 806 and also setting the ECC flip flop 819 allowing the station to reoriginate on the second line appearance or just remain talking to the original called party.

Assuming that the calling station decided he had dialed the wrong number and wanted to reoriginate on the second line appearance, he would again flash his hookswitch, to mark the HSM lead with a ground for a period longer than 200 ms. and less than 1.2 secs. This ground sets the line relay flip flop 806, and of course, at the same time the other functions previously described occur.

The subscriber dials the second line appearance and makes connection to the dialed station. At the same time, again, the LSA and LF leads go low setting flip flop 809 once again. The calling station is now able to set up a conference call or complete the conversation with the second station and need not add the second station to a conference if he desires.

Assuming that the subscriber does want a conference call, he marks his HSM lead once again by a hookswitch flash causing a pulse longer than 200 ms. and less than 1.2 seconds. The output of flip flop 806 is returned to its normal state restraining the L relay of FIG. 4 to its normal appearance. As a result, the output of flip flop 806 went low setting the TWC flip flop 808 to produce an output on the TWC lead. On the output of flip flop 808, gate 926 goes low resetting flip flop 807, restoring lead H1 to its static state.

Now that the calling station has a conference call set up, the system remains in that state for the call duration. There are two ways to terminate this call at this time, either by disconnecting or opening the OHM lead or by flashing the hookswitch again to mark the HSM lead. If the HSM lead was marked once again, flip flop 828 is set over lead 831, causing the line flip flop 806 and the TWC flip flop 806 to restore to their static state and also set the ECC flip flop 875 to enable this subscriber to originate another call if desired.

When the conference call is set up and the calling station does not mark his HSM lead but for some reason lead S1 goes back to a high condition, output of gate 925 will put out a small one-shot which is determined by the time constant of resistor 887 and capacitor 888. This one-shot will set one input to gate 818 low setting the output of gate 818 thereby, setting the line relay for the second appearance. Once again, the ECC flip flop 819 will be reset to its static condition. The same condition would appear if the S2 lead were to go high after the conference was set up. A small one-shot would appear out of the output of gate 891, resetting the conference flip flop 808 output on the TWC lead, and resetting line flip flop 809 which would have already been on line appearance No. 1. All devices should be in their static state on a power-on condition.

Also, removal of any card in the system will not affect the subscriber on the normal line circuit operation. This card removal would only act to cancel the custom calling portion of the circuit.

We claim:

1. Apparatus for providing special service features of a first, or second or first and second type for a telephone system wherein said apparatus may be provided for a telephone station and line having access to said telephone system through an intermediate distributing interconnection, said apparatus including means insertable into said system at said interconnection to provide services to the line to which connected, said apparatus including a control circuit interfacing between said line and line equipment in said system, said control circuit including a plurality of control conductors, a first circuit for providing said first type of special sevice feature, a second circuit for providing said second type of service, and a third circuit for providing both said first and said second type of service, and plural conductors in each of said first, second and third circuits to be connected in the alternative to said control circuit conductors to provide type or types of service indicated by the connected first, second or third circuit.

2. An apparatus as claimed in claim 1, in which said control circuit includes a relay for each of said conductors.

3. An apparatus as claimed in claim 2, wherein said line has two line appearances assigned thereto at said line equipment, and means in said apparatus for holding a first call to said line over one of said line appearances while a second call through said system is attempted over the other line appearance.

4. An apparatus as claimed in claim 3, wherein the first of said types of service is call waiting service, said first and third logic circuits include means for initiating a hold condition on one of said calls over either of the line appearances.

5. An apparatus as claimed in claim 4 wherein the second of said types of service features is a three-way calling service, and said second and third logic circuits provide circuits for holding cne of said calls over only one line appearance.

6. In a telephone system, apparatus for providing a plurality of special services to a line having a normal line appearance, and a special services line appearance with a sleeve lead for said special line appearance, means in said apparatus responsive to a seizing signal received over said second appearance for determining which of said services is desired responsive to said seizing signal, comprising first circuit means for delaying receipt of said seizing signal over said sleeve lead to said first circuit means for a predetermined period, means operative at the end of said period for sensing the condition of said sleeve lead wherein a first condition of said sleeve lead signifies one special service and a second condition signifies another special service, and a circuit member responsive to the condition sensed for actuating certain circuit members and certain output leads to implement the selected service.

7. In a telephone system, the apparatus of claim 6, wherein said condition sensing circuit member comprises a bi-stable device.

* * * * *